Feb. 11, 1947. A. H. GAEBEL 2,415,424
CAMERA WITH COPY AND IMAGE CENTERING MEANS
Filed Feb. 5, 1943 8 Sheets-Sheet 1
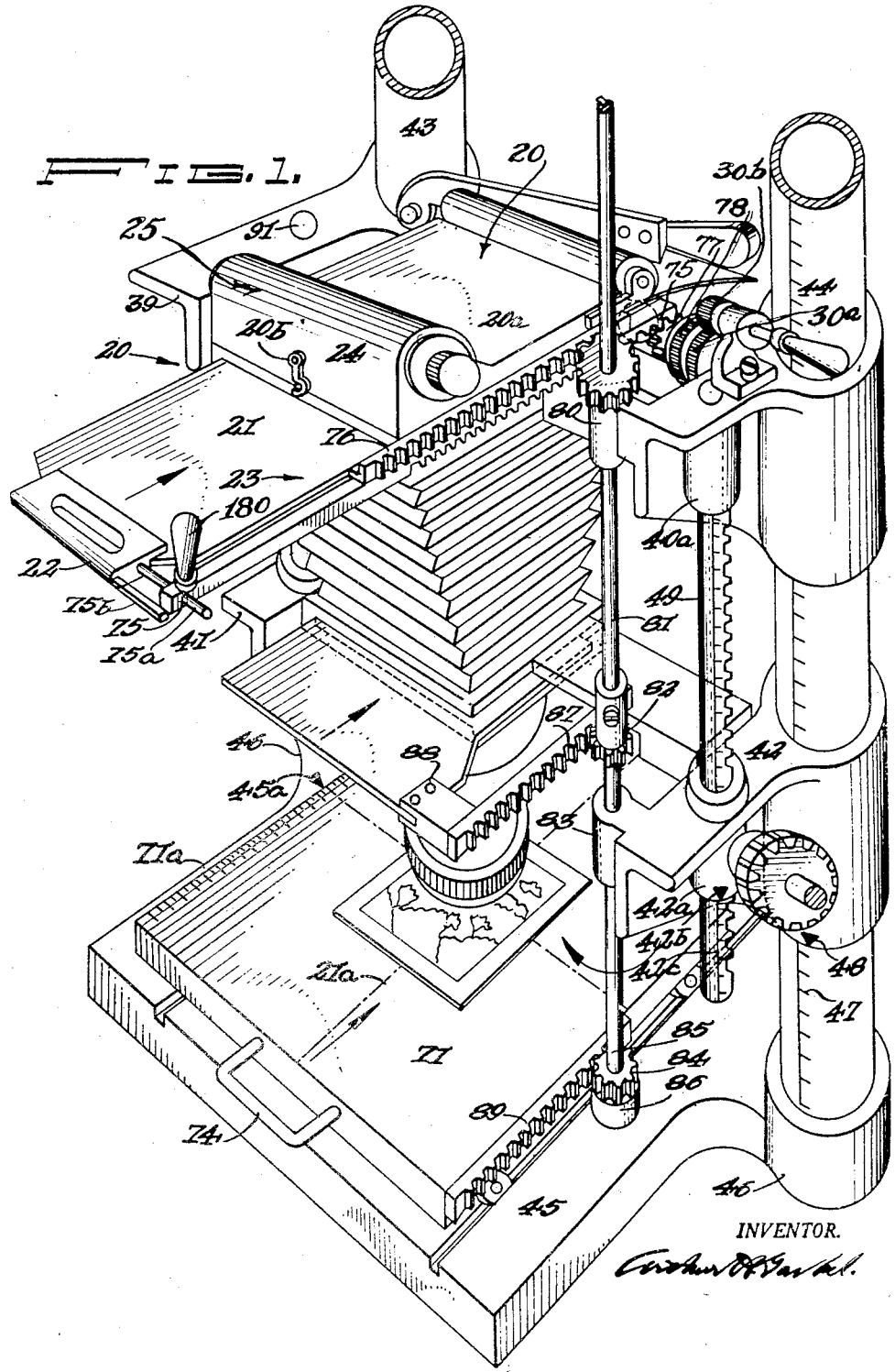
INVENTOR.

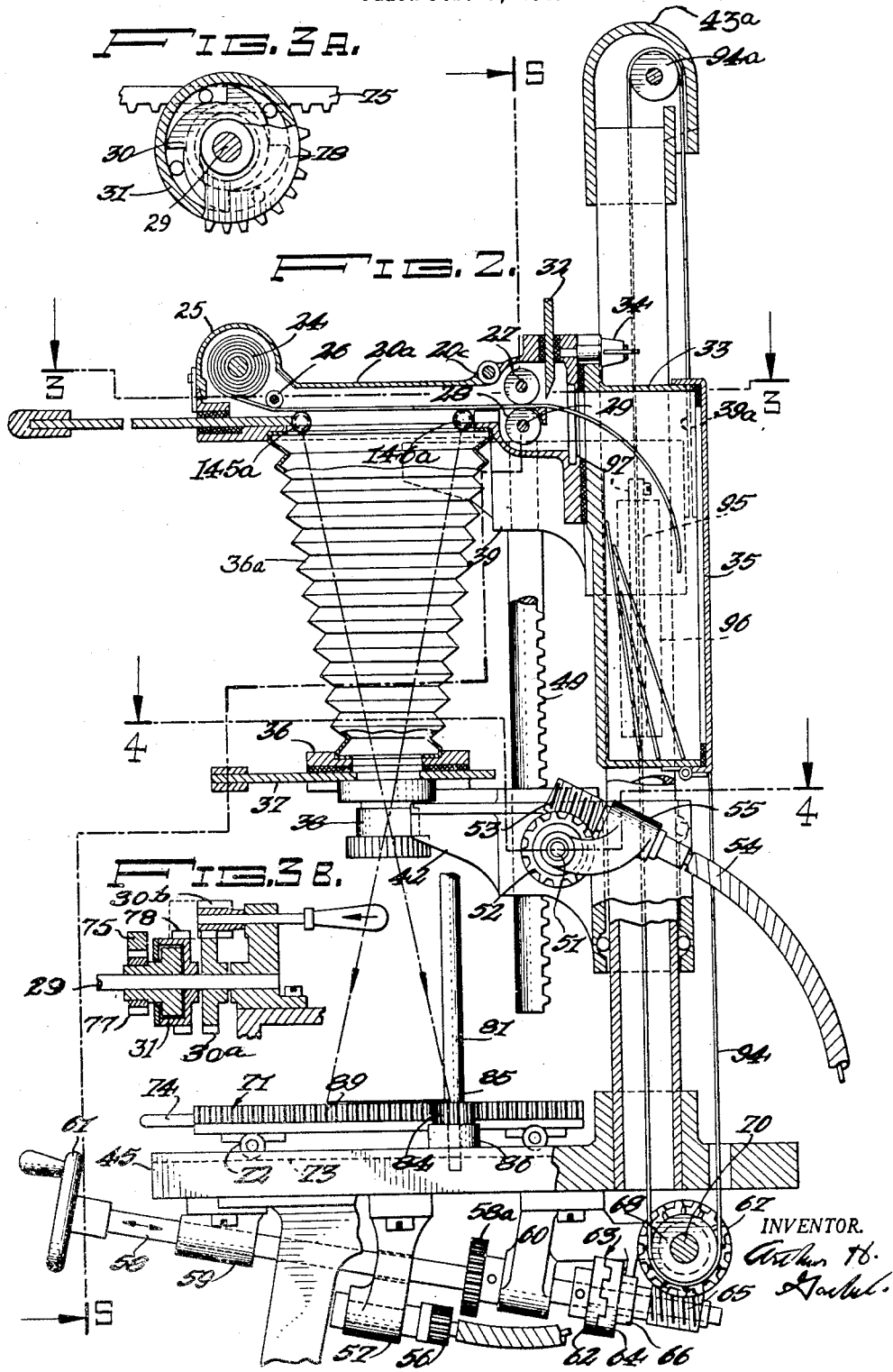

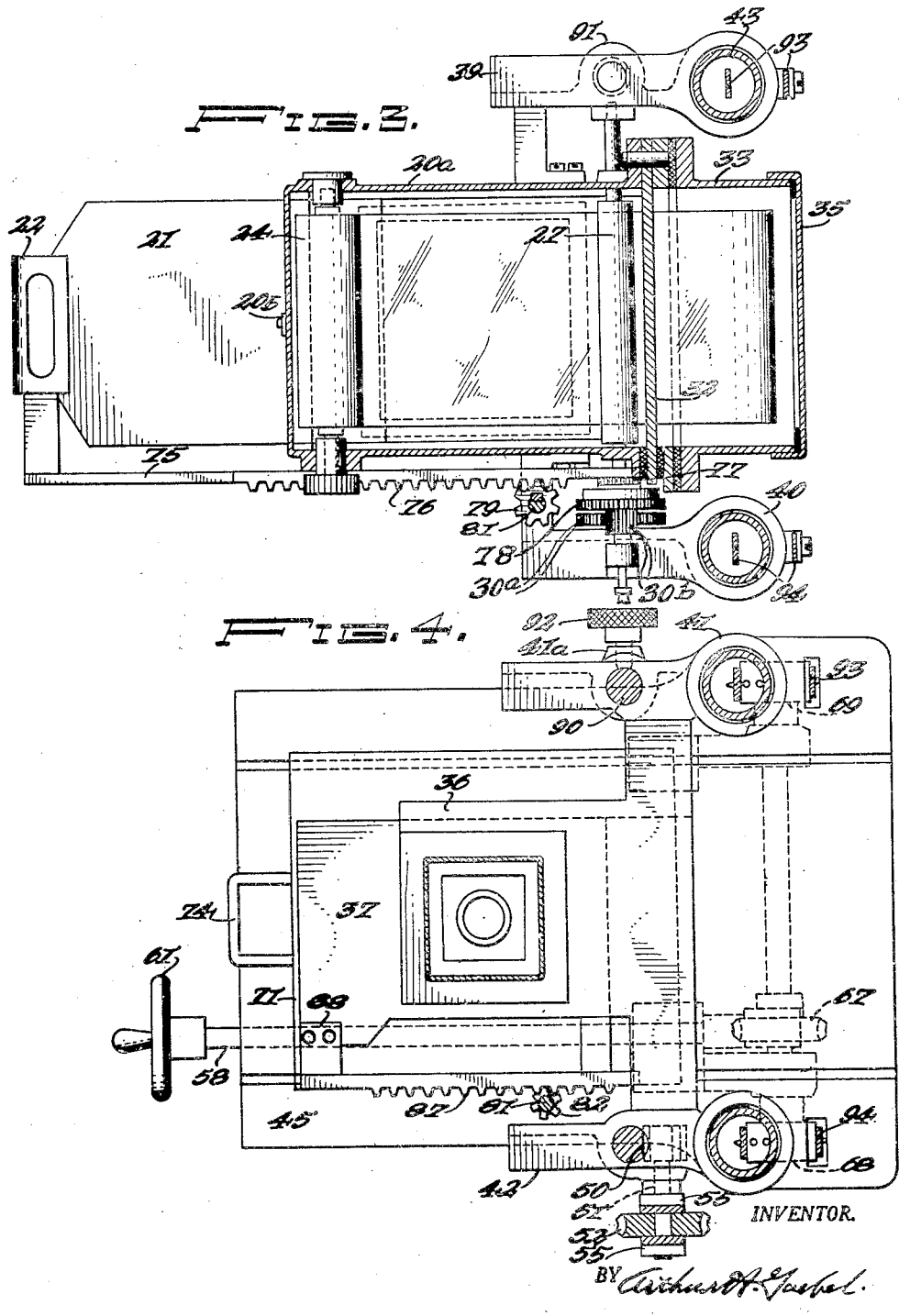

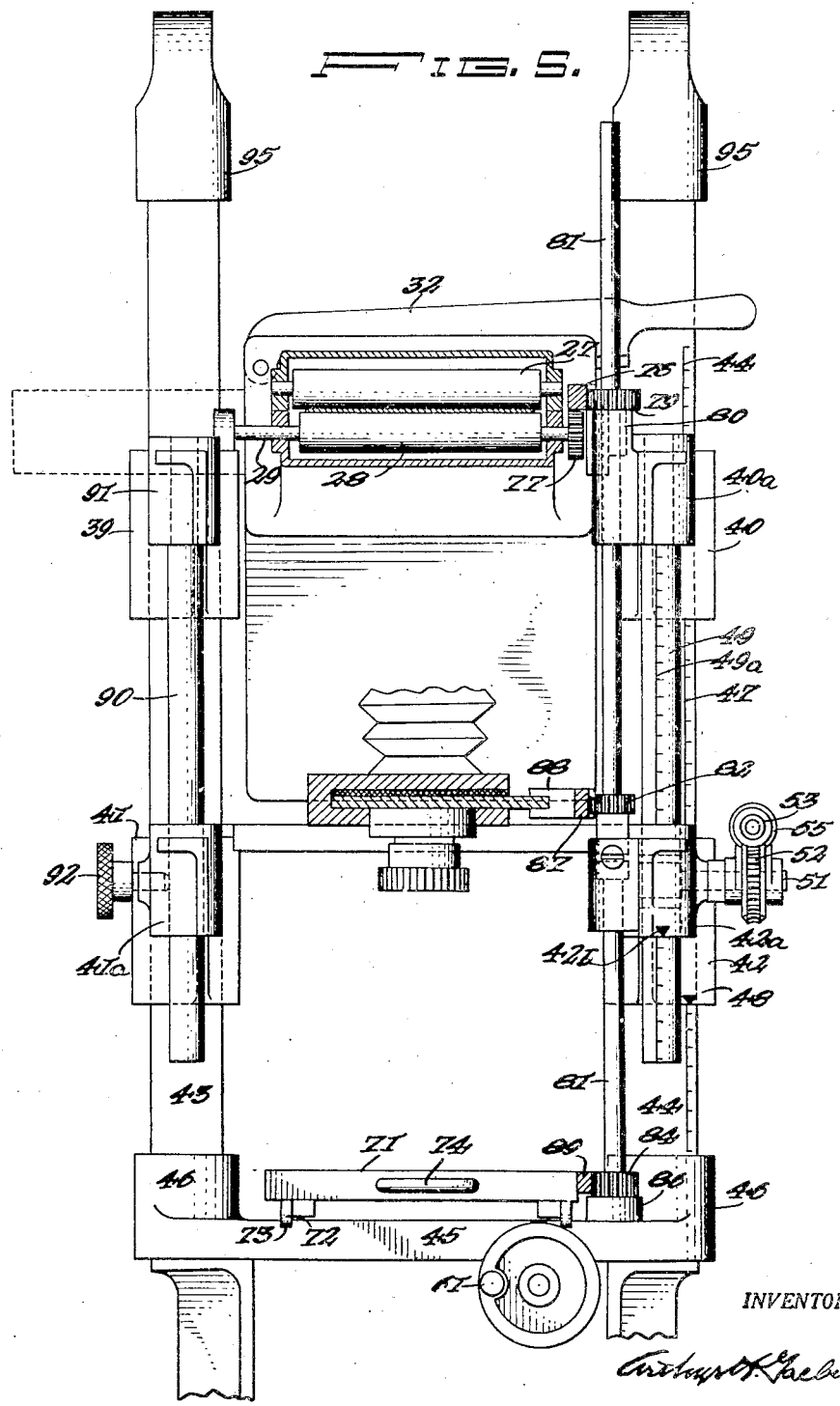

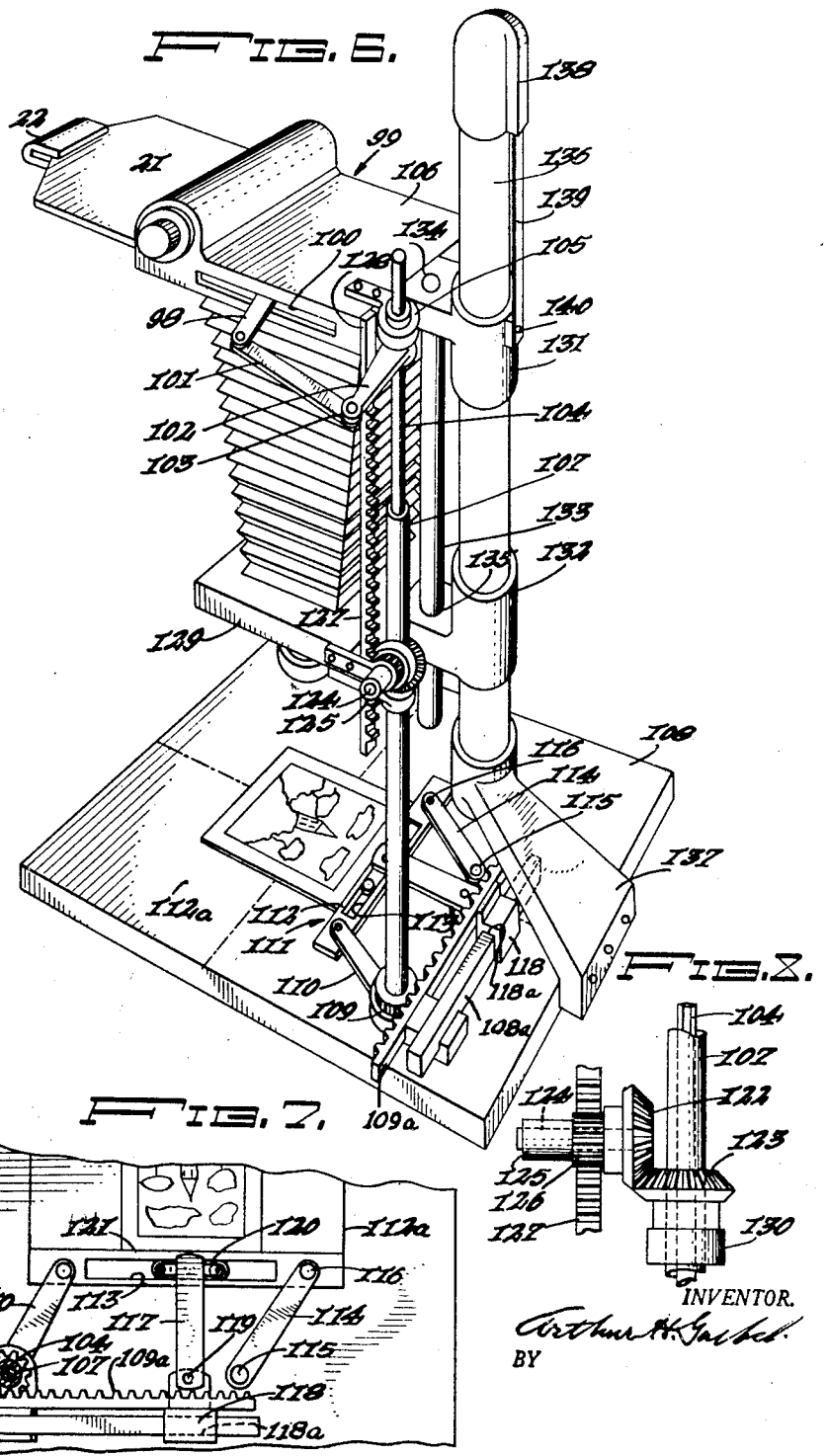

Feb. 11, 1947.    A. H. GAEBEL    2,415,424
CAMERA WITH COPY AND IMAGE CENTERING MEANS
Filed Feb. 5, 1943    8 Sheets-Sheet 6
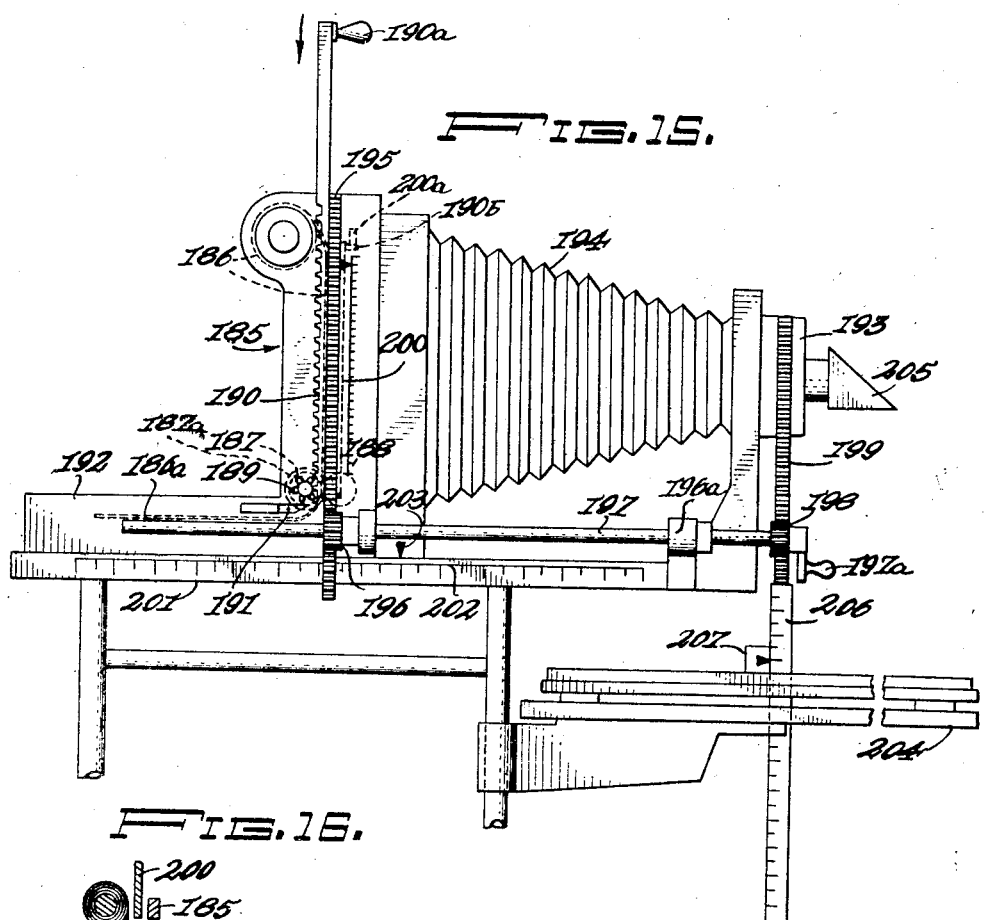
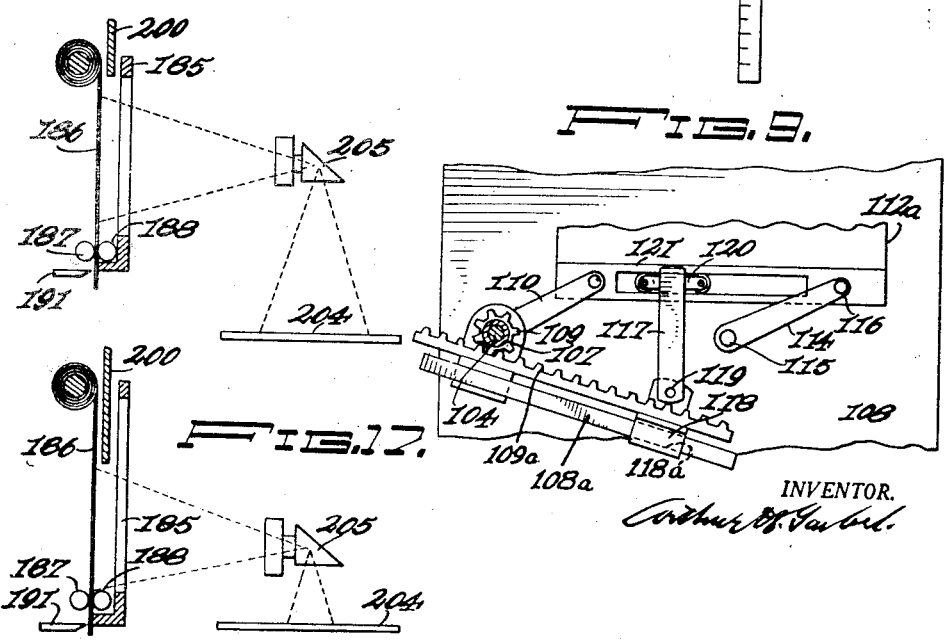
INVENTOR.
Arthur H. Gaebel Feb. 11, 1947.　　　　A. H. GAEBEL　　　　2,415,424
CAMERA WITH COPY AND IMAGE CENTERING MEANS
Filed Feb. 5, 1943　　　　8 Sheets-Sheet 8
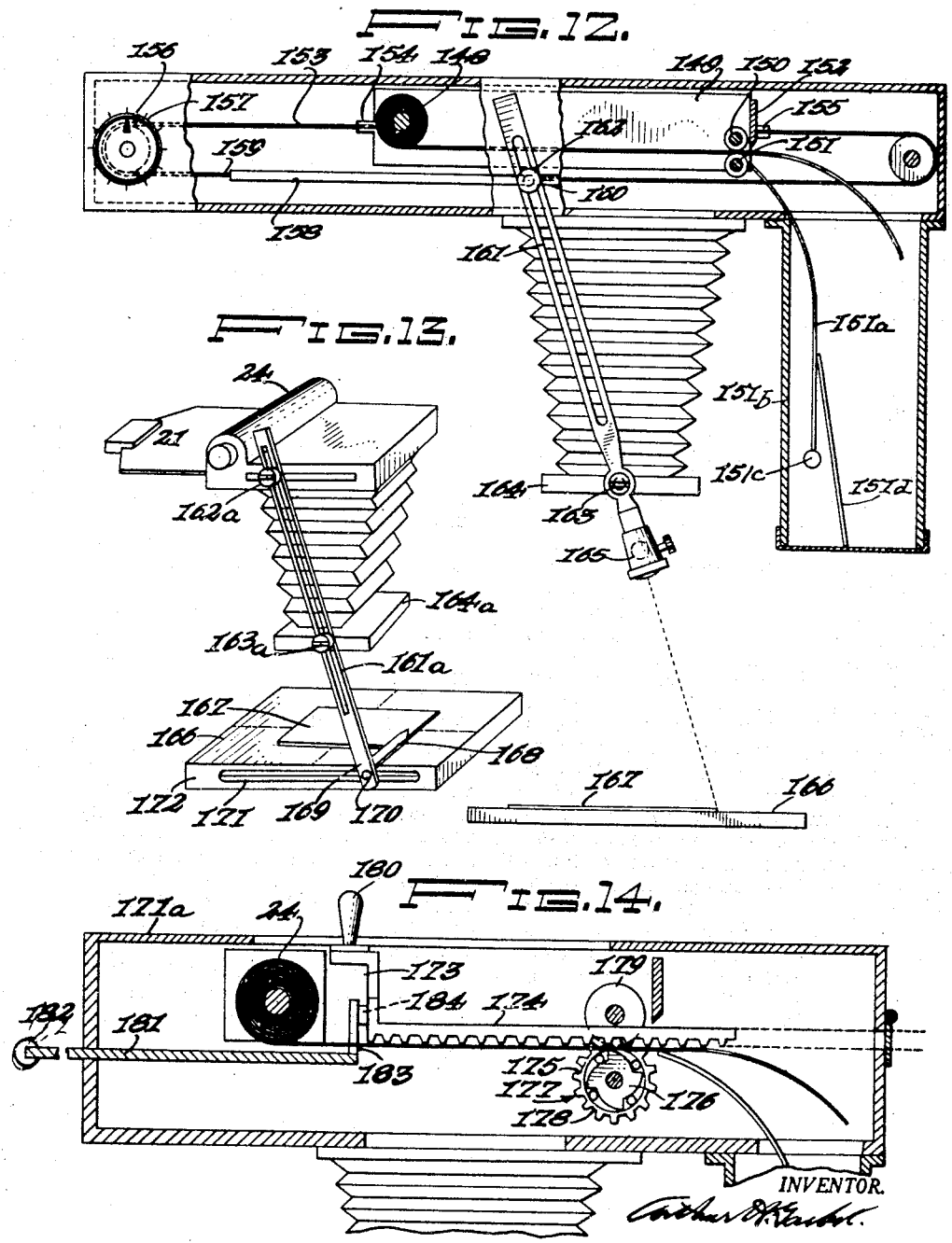
INVENTOR.

Patented Feb. 11, 1947

2,415,424

UNITED STATES PATENT OFFICE 2,415,424

CAMERA WITH COPY AND IMAGE CENTERING MEANS

Arthur H. Gaebel, Larchmont, N. Y.

Application February 5, 1943, Serial No. 474,794

15 Claims. (Cl. 88—24)

This invention relates to photographic devices and more particularly to copying cameras such as are used for copying letters, records, maps, etc., and in photo-engraving and lithography for reproducing photos, art work, type matter and the like in actual size and in various enlargements and reductions.

In the first instance this particular camera is used for making enlargements or reductions and facsimiles from drawings, photos and the like that are placed upon a copy table located under and parallel to the focal plane of the lens, the camera comprising a housing to hold a supply of light sensitized material, a lightproof curtain or mask which normally covers said sensitized material, a lens carrier having a lens and connected to the housing through the medium of a bellows, and a table which holds the copy to be photographed.

In the second instance the invention may be applied to a camera having a right angle prism or mirror and therefore having the copy table at an angle to the focal plane of the lens.

One object of this invention is to provide means for moving the mask to expose a length of sensitized material to the action of the lens while simultaneously centering the lens and copy holder to the center of the exposed portion of the said material.

A second object is to provide means to readily determine the exact amount of sensitized material to be exposed to the action of the lens, and at all enlargements or reductions of any object, drawing, etc.

A third object is to provide means for discharging the exposed material and advancing a like portion of fresh material into the same area.

A fourth object is to provide means to sever such exposed material.

A fifth object is to provide a copying camera having its component elements above one another in order to save floor space.

An additional object of this invention is to provide a light source used to locate the position of the image within the camera from a point outside of the camera located upon the copy holder for readily determining the amount of sensitized material to be exposed to the action of the lens, said light source being operated through the motion of the mask and the focal length of the camera.

Means for removing the exposed material to the dark room for developing are also provided.

Roll sensitized material copying cameras now in common use have the roll of material in a fixed position at the top of the housing and extending downwardly to the feed roller and severing means, the material being in a vertical position, and having a light protective curtain which also rolls down from the top to protect that portion of the material not to be exposed.

Therefore the material exposed to the action of the lens is always out of center of the lens except when the entire area is being exposed for the largest photo and this is by far the rare exposure rather than the average.

It is readily seen that when the smaller exposures are made that only that material starting from the very lowest point in the camera is exposed to the action of the lens, while the subject is placed far out of center of the lens also in order that its image may be cast into this area, all of which forces the light rays to be bent by the lens at angles detrimental to the making of clear, sharply defined lines due to the fact that these lenses do not resolve sharply at angles of over 22½ degrees below their optical axis or center.

It is necessary to adjust the ground glass to locate the image onto the exposable area and at times to adjust the lens to a lower than normal position in order to attain this result, the former requiring time and labor and the latter throwing the graduated scale out of alignment for taking the distance between the lens and object.

To overcome these disadvantages my camera utilizes a housing holding the sensitized material, which will hereafter be termed the film, a light excluding curtain or sheet, which will hereafter be termed the mask, arranged to slide within the housing in such manner as to uncover at will of the operator a measured amount of film to the action of the lens and to simultaneously move the lens in the same direction with the movement of the mask but at half the speed and to move the copy holder also in the same direction at the speed of the lens thereby holding the object always in the center of the lens and in the center of the exposed portion of the film.

In a camera having the copy holder at right angles to the plane of the lens it is not necessary to move the copy holder, as in this type of construction my lens is fixed to travel only toward and away from the center of the copy table and it is only necessary to place all objects at the center thereof, move the lens and mask, and the image will be centered. The mirror reflector in this type of camera is used to reverse the image.

It is understood that in my vertical type camera where all elements, copy table, lens carrier and film are held in parallel planes, that if it be required that the image be reversed from the normal action of the lens alone a series of mirrors or a pentagonal or roof type prism may be used without affecting the working of my invention.

One object of this invention therefore is to provide a copy camera having a film housing including a movable mask, a movable lens and a movable copy table and means for moving all three in the same direction but at different speeds and in the second instance moving only the lens and mask in the same direction at different speeds and providing a scale attached to the lens carrier for measuring the distance between the lens and copy table.

These and other objects and features of the invention will appear from the following detailed specifications and the accompanying drawings.

Referring to the drawings:

Fig. 1 is a perspective view showing details of the copy camera in question and including the movable mask, film housing, lens carrier and copy table. It also illustrates the manner the mask, the lens carrier and the copy table are geared to a common shaft for simultaneous operation, the film ejection means and severing means being also shown.

Fig. 2 is a cross section through the copy camera shown in Fig. 1 showing the details of operating the mask, discharging the already exposed film and supplying fresh film for the next exposure. It also illustrates how the distance of the lens to the copy table and the distance of the film and lens can be changed by the operation of a single crankshaft at the base of the device.

Fig. 3a is a section through the one way clutch facilitating the discharge and recharging of the film to the exposure position.

Fig. 3b is a section taken on the line 3b—3b of Fig. 3a showing further details of the one way and the disengageable clutch.

Fig. 3 is a section taken on the line 3—3 of Fig. 2 showing further details of the mechanism used in advancing the film to exposure position and for moving the mask.

Fig. 4 is a section taken on the line 4—4 of Fig. 2 showing further details of the mechanism for changing the focal length of the camera.

Fig. 5 is a section taken on the line 5—5 of Fig. 2 showing the common shaft operating the mask, lens carrier and copy table.

Fig. 6 is a modification of the copy camera shown in Fig. 1.

Fig. 7 is a plan view of the parallelogram shown in Fig. 6.

Fig. 8 is a detailed view of the bevel gears which are used to operate the parallelogram shown in Figs. 6 and 7.

Fig. 9 shows the parallelogram shown in Fig. 8 moved to another position to that shown in Fig. 7.

Figure 10:
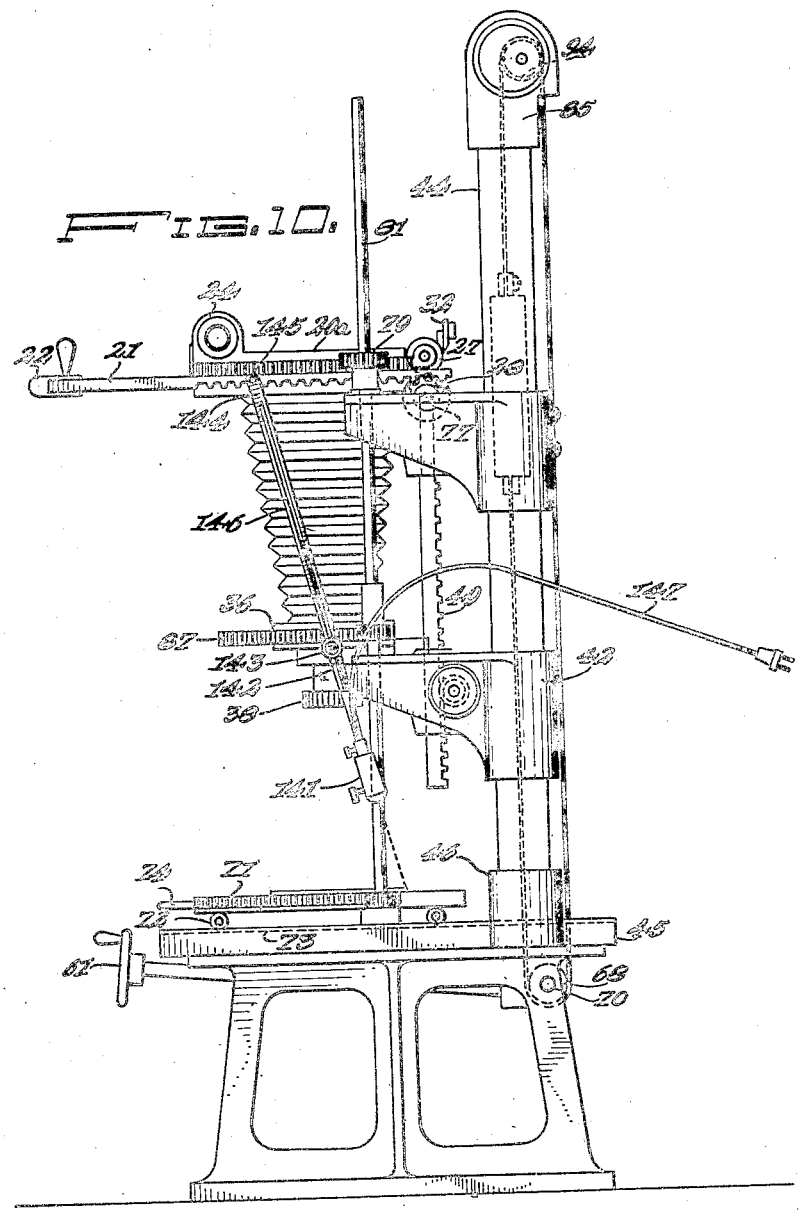

Fig. 10 is another modification of the copying camera shown in Fig. 1. The camera shown in this view has a light source including a bulb throwing a beam of light but is projected from an arm that is hingeably supported upon the camera. This light is utilized to locate the position of the edge of the mask within the camera to the edge of the drawing to be photographed on the copy table preliminary to taking the picture.

Figure 11:
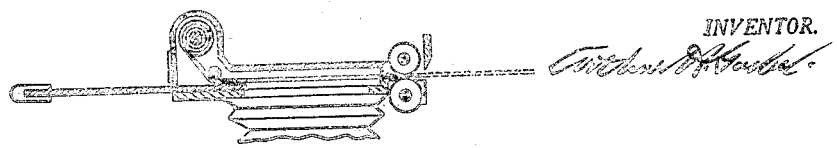

Fig. 11 is a section through the film holder of the copying camera shown in Fig. 10.

Fig. 12 illustrates another modification of the copying camera shown in Fig. 1. In the latter case the film is held upon a movable carrier while the mask determines the position of the light source upon the arm and the projected light on the copying table indicates the position of the mask in relation to the copy.

Fig. 13 is another view of another modification of the camera shown in Fig. 1. In this latter case the pointer is used to locate the position of the image within the camera in relation to the copy on the copy table preliminary to making the exposure.

Fig. 14 is a further modification showing an arrangement wherein the mask and the film ejector respectively are movable. The movement of the film ejector is restrained through a stop located upon the mask so as to prevent it from advancing more than the amount exposed and to advance only an amount equal to it.

Fig. 15 illustrates the use of my invention in connection with a copying camera that has its copy table at right angles to the focal plane of the lens.

Fig. 16 is a diagrammatic view showing the manner in which the light rays enter the camera shown in Fig. 15 through the lens when exposing a full length of film, the lens being centered to the length of film to be exposed.

Fig. 17 is a diagrammatic view showing the arrangement of parts in my camera when taking a smaller picture than shown in Fig. 16. Note that in the latter case the focal axis of the lens is again in the center of the exposed length of film.

Referring to Fig. 1, numeral 20 indicates the housing of the copying camera that supports the sliding mask 21. The sensitive film 24 (Fig. 2) is located within the housing 25 that is located over the mask 21. The film 24 is placed under an idler 26, Fig. 2, and then is passed between a pair of rollers 27 and 28. The roller 27 is an idler while the roller 28 is driven by the shaft 29 which in turn is attached to the ratchet member 30 of the one way clutch 31 (Fig. 3a). The one way clutch is constructed in such a manner as to allow the roller 28 to rotate only in clockwise fashion thus exerting a pulling action upon the film 24. A cutting knife 32 is located beyond the rollers 27 and 28 to facilitate the cutting off of the exposed film. After the film is cut it is deposited within a lightproof box 33 that is attached by a thumbscrew 34 to the housing 20 of the camera. In case that the already exposed film has to be removed from the lightproof box 33 and should the camera be in a darkroom, a cover 35 is hingeably attached to the box 33 which can be opened to remove the film, or the whole lightproof box 33 can be removed by unscrewing the thumbscrew 34.

The film housing 25 has a cover 20a hingeably attached thereto which can be opened when it is required to charge the device with a fresh roll of film. The cover 20a is opened by turning the hook 20b and hinging the cover upon the hinge 20c.

A slide may be provided to make the box 33 light tight while carrying it from the camera to the darkroom.

A lens carrier 36 which is located under the housing 20 has a lens holder 37 that is slidably attached thereto. The lens 38 is attached to the lens holder 37 ad slides along whenever the lens holder is moved.

The lens carrier is connected to the film holder through the medium of a light proof bellows 36a.

The housing 20 is attached to a pair of sliding members 39 and 40 while the lens carrier 36 is attached to a pair of sliding members 41 and 42. The members 39, 40, 41 and 42 slide vertically upon a pair of upright supports 43 and 44 which are attached to a base 45 upon the extensions 46. A calibrated scale 47 is etched upon the upright 44 and a pointer 48 is located upon the member 42. A gear rack 49 is rigidly attached to the hub 40a of the member 40 and is slidably fitted within the hub 42a of the member 42. A spur gear 50 (see Fig. 4) is in mesh with the gear rack 49. The gear 50 is secured to the operating shaft 51 which in turn is attached to a worm gear 52 that is rotated by a worm 53, Fig. 5. The worm 53 is turned by the flexible shaft 54, Fig. 2, one end of which rotates within the bearing 55 that is attached upon the shaft 51.

The other end of the flexible shaft 54 is attached to the spur gear 56 and rotates within the bearing 57 which is secured to the underside of the base 45. A crankshaft 58 is supported within the bearings 59 and 60 held under the base 45. The rotation upon the handle 61 of the crankshaft 58 will rotate the male member 62 of the two way clutch 63 which in turn will rotate the female member 64 of the clutch 63. The female member 64 is secured to a worm 65 that is supported by the bearing 66 and rotates a worm gear 67. A pair of toothed pulleys 68 and 69 is secured upon a common shaft 70 and rotated by the action of the worm gear 67 whenever the crank-shaft 58 is operated by the operator to raise or lower the copying camera 20 above the copy table 71.

The table 71 is slidably located upon the base 45 and has a number of small wheels 72 that are fitted within grooves 73 that are cut into the top of the base. A handle 74 is attached to the copy table 71 to help in moving it upon the base.

A gear rack 76 is attached to the mask 21 and moves along whenever the mask is moved. A secondary gear rack 75 is attached to the gear rack 76 through the removable pin 75a. The sliding motion of the gear rack 75 rotates the spur gear 77 that is attached by means of the one-way clutch 31 to the member 78 as shown in Figures 3a and 3b. The gear 78 can be connected to the shaft 29 by means of the gear 30a fixed to the shaft 29 and a gear 30b which is shiftable into mesh with the gear 78.

The gear rack 76 is in mesh with the spur gear 79 that is held upon a bushing 80 of the member 40 that is slidably secured upon the upright shaft 81. An additional gear 82 is held upon a bushing 83 of the member 42 and is slidably secured to the upright shaft 81 so that the shaft 81 is made to slide within the gear 82. A third gear 84 is rigidly held to the lower end 85 of shaft 81 which in turn rotates within a bearing 86 upon the base 45.

The spur gear 82 is in mesh with a gear rack 87 attached at 88 to the lens holder 37 and the spur gear 84 is in mesh with the gear rack 89 attached upon one margin of the copy table 71, while a spacer rod 90 is rigidly held to the member 39 at 91 and is made to slide within a nub 41a of the member 41. A thumbscrew 92 serves to secure in place the rod 90 to the member 41 after the focal length has been set by rotating the crank-shaft 58.

The crank-shaft 58 is slidably held within the bearings 59 and 60 in such a manner as to allow the shaft to be moved outwardly by the operator. The above mentioned action will disengage the male member 62 of the clutch 63 from the female member 64 but will engage the spur gear 56 to a spur gear 58a that is rigidly attached upon the crank-shaft 58. By turning upon the shaft 58 the spur gear 58a will turn the spur gear 56 which in turn will rotate the flexible shaft 54 that turns the worm that operates the worm gear 52. The worm gear 52 being attached to the spur gear 50, by means of the shaft 51, will cause the lens carrier to move along the rack 49 whenever it is required to change the distance between the lens carrier 36 and the film housing 20 when changing the focal length. A calibrated scale is etched on rod 49 and an indicator is attached to support 42 to facilitate setting to the proper focal length.

To facilitate the vertical movement of the copying camera upon the uprights 43 and 44, a pair of slotted endless belts 93 and 94 are attached to the toothed pulleys 68 and 69. One end of the endless belt 93 is attached at 39a to the back of the member 39, passes over an idler roller 94a, located at the top 43a of the upright 43, and then it passes through a center opening 95 of and is connected to the counter weight 96 that is movable axially of the tubular upright 43. After passing under the toothed roller 67, the belt 93 extends back to its starting position at 39a. The belt 94 is passed over a roller 94a at the upper end 95 of the tubular member 44 is connected to another counter weight 96', then again under the toothed roller 68 and back to its starting position 40a upon the member 41.

Fig. 2 shows two tubular lights on the inside of the camera, their rays projected by the camera lens upon the copy table. The light 145a is attached to the edge of the mask and travels with it, and the light 146a is attached to the extreme opposite edge of the housing 20 at the spot where the film goes between the rollers 27 and 28 and is adjacent roller 28. The lights may be flashed on and the camera lens 38 projects their images upon the copy table as two lines of light. Naturally the lights must be of red color so as not to fog that portion of the film that is exposed between the edge of the mask and the rollers, and a colored protective filter must be inserted in the lens 38 to prevent outside rays of actinic properties from entering the camera and fogging the exposed film.

The copy table is adjusted until the two bars of light encompass or border the object to be photographed. Moving the copy table in the direction of the arrow by the handle 74 will move the mask and light closer to the fixed light 146a and likewise the images upon the copy table will be moved closed together but will always show the exact available area of film that is exposed to the action of the lens. The camera must be in its proper focal adjustment and it is then only necessary to move the copy table until the lights lie outside of the area covered by the subject to be copied.

Referring to the modification in Fig. 10, it differentiates from the camera shown in Fig. 2, in that its light source lies outside of the camera and therefore need not be colored nor of a protective character and no filter is required in the lens but its function is the same as the light source 145a in Fig. 2. Only one boundary is indicated when a single light is used but if the copy is placed exactly in the center of the copy table then the opposite boundary will be encompassed within the area of the exposed film. Fig. 10 shows a source of light 141 which consists of an electric bulb and lens held within a reflector and having a focussing adjustment knob 141a that is held upon an arm 142 and is hingeably attached to a pin 143 fastened to the lens carrier 36. The other end 144 of the arm 142 is pivoted upon a pin 145 which is attached to the gear rack 75. The arm 142 has a slot 146 within which the pin 143 slides when the focal length of the camera is changed. An electric cord 147 is supplying current to the source 141 to reflect a beam of light upon the copy table 71. While no description of the electric cord was given for the tubular lights described above as in Fig. 2, it is assumed that they are provided as required. It is also assumed that the lights in Fig. 2 may be of any color or type or may be of fluorescent material that will reflect its brilliance from light transmitted to it that would not affect the exposed film. It is understood that film is made in many varieties of varying sensitivities, as for instance infra red film, panchromatic, etc. and that photo electric cells may be placed upon the copy table along one edge thereof to receive the rays and record the spot by lighting small lights.

In the case of the device shown in Fig. 12, the sensitive film 148 is held upon a moving film carrier 149 in connection with the film rollers 150 and 151 and the film cutting knife 152. The film carrier 149 is moved by an endless belt 153 having one end thereof attached at 154 to the front of the film carrier 149 and the other end held at 155 to the rear end of the film carrier 149. The belt 153 is moved by a knob 156 that is rotated by the operator against a scale 157 which determines the amount of motion and the distance the film carrier 149 has moved in respect to the length of film to be exposed by the mask 158. The mask 158 is attached to the belt 153 at 159 and 160. A slotted arm 161 is fastened upon the outside of the camera by the pin 162 which is held at 163 upon the mask 158 while the other end of the arm 161 is hingeably secured by the pin 163 upon the lens holder 164. In this case as in the device shown in Fig. 10, a source of light 165 is attached to the end of the arm 161. The light source 165 is projecting a beam of light upon the copy table 166 thereby disclosing the position of the mask's edge in the camera above and facilitating the setting of the mask to the proper point to encompass the image without waste of film. The curtain 151a travels with the film carrier 149 and is used to prevent the severed film from falling into the camera and directs said film into the light tight box 151b. The weight 151c exerts a pull on the edge of the curtain. 151d is a piece of the film previously severed. In this device the lens and copy remain in fixed axial position and the film holder and mask alone move to center or select portions of the image.

Referring to the modification shown in Fig. 13, the device is similar to the one shown in Fig. 12. While in the case of Fig. 12 a beam of light has been used as the indicator, in the latter case a pointer 168 is used. The pointer 168 is attached upon the lower portion 169 of the slotted arm 161a that is pivotably held at 162a to the camera housing 26a and is hingeably attached to the lens carrier 164a at 163a. The lower portion of the arm 161a has a sliding pin 170 that is fitted within a slot 171 in the side 172 of the base 166. This arrangement makes it possible to hold the pointer 168 in the right position upon the base 166 and just above the object 167.

In the modification shown in Fig. 14 the film housing is indicated at 171a. Mounted with the housing is the film feed actuating rack 174 which through a gear 175 operates a driving mechanism 177 comprising a gear 175 and one-way clutch 176 to operate a film feed roller (not shown) cooperating with an idle feed roller 179. The forward end of the rack 174 is provided with an upwardly extending member 173 on which is secured the operating knob 180 which moves in a slot in the upper wall of the housing. The mask 181 extends through the front end wall of the housing and is provided with a manipulating means 182 at its forward end. At its inner end, the mask is provided with an upwardly extending stop member 183 with which cooperates a stop pin 184 carried by the upward extension 173 of the rack 174 to control the film feeding movement of the rack in accordance with the position of the mask.

Referring now to the right-angle photo-carrying camera shown in Fig. 15, it comprises a film housing 185 that holds the film 186. The film 186 is made to pass between feed rollers 187 and 188 which are driven by means of a gear 189 located upon the outside of the film housing 185. The gear 189 is in mesh with a gear rack 190 that is pushed in the direction shown by the arrow when the operator desires to remove a certain length of film. The rack has a handle 190a and a projection 190b. The mask 200 also has a projection 200a protruding into the path of the travel of projection 190b and thereby restraining its motion upward to the length of the exposed area of the film as determined by the position of the mask. Moving the handle 190a downward revolves the one way clutch 187a attached to the spur gear 189 in clockwise direction and through the feed roller 187 and idler roller 188 ejects the exposed film into the light tight developing chamber or other receptacle 192, and advances a like amount of fresh film into the exposure position. A knife blade 191 is used to cut the exposed film 186a from the rest of the film 186. The housing 185 is connected to the lens carrier 193 by means of a bellows 194. A secondary gear rack 195 is attached to the mask 200 within the camera through a light tight slide of well known construction so that when the rack 195 is moved the mask 200 will follow.

When it is desired to set the camera to take an exposure, the crank-handle 197a is turned and being attached to shaft 197 revolves the spur gear 198 and the twice-as-large spur gear 196. The gear 198 lowers or raises the center of the lens while the gear 196 raises or lowers the mask in the same direction but at twice the speed. In this manner the lens is always held in the center of the length of the exposed film. The film housing 185 is now moved upon its supporting frame 201 and along the scale 202 indicated by the pointer 203 etched upon the housing 185. The copying table is next lowered or raised, the scale 206 being used against a pointer 207 etched upon the copy table 204. When changing the focal length, the shaft 197 slides within the bearing 196a and the gear 196. When setting the lens and mask 200, the scale etched upon the housing 185 is used by the indicating pointer attached to the rack 195. It will be noted that the scale 206 is rigidly fastened to the lens carrier 193 through the rack 199, and moves up and down with the lens and therefore gives the lens-to-copy-table distance at all times upon the placing of the pointer. The one way clutch and film ejector means are similar in construction to that shown in Fig. 14, and have been described in conjunction with its use on the camera shown in Fig. 1, with this difference that the two way clutch shown in Fig. 3b will not be required.

Referring to the modification shown in Figs. 6 to 9, the mask 21 has an extension 98 extending beyond the camera 99 through the slot 100. The extension 98 has an arm 101 pivotably attached thereto which in turn is attached at 103 to the swivel arm 102. The swivel arm 102 is secured to an upright shaft 104 which rotates in a bearing 105 attached to the film housing 106 and it is fitted to or within a hollow secondary shaft 107 which extends below the camera 99 to the base 108 and has a gear 109 attached thereto. The upright shaft 104 extends beyond the lower portion of the hollow shaft 107 and is attached to an arm 110 of a parallelogram 111, Figs. 7 and 9, which consists of a straight slotted bar 112 which has a slot 113 and a secondary arm 114 hingeably attached at 115 upon the base 108 and at 116 to the straight bar 112. An additional arm 117 is hingeably attached at one end at 119 to a sliding bearing 118 and has its other end securely held upon a sliding bearing 120 which has a pair of rollers 121. The rollers 121 slide within the slot 113 of the straight bar 112. The straight bar 112 is attached to a copy table 112a that moves along with the bar 112 when the parallelogram 111 is operated by the rotation of the shaft 104. The gear 109 is in mesh with a gear rack 109a that is attached to the sliding member 118 while the member 118 has a square opening 118a fitted over a square support 108b. The hollow shaft 107 is rotated through the medium of a pair of bevel gears 122 and 123. The bevel gear 123 is fixed to the hollow shaft 107 while the bevel gear 122 is held upon a shaft 124 which rotates within a bearing 125. The shaft 124 has also a spur gear 126 which rotates within a bearing 125. The gear 126 is operated by a gear rack 127 that is held upon the film housing 106 at 128.

The bearing 125 is rigidly secured upon the lens carrier 129 and the bearing 130 is held upon the lens carrier 129 while the hollow shaft 107 rotates within the bearing 130.

The camera proper 99 is held upon a pair of sliding members 131 and 132 and the film housing 106 is held upon the member 131 while the lens carrier 129 is secured upon the member 132. A spacer rod 133 is rigidly attached at 134 upon the member 131 and is slideably held at 135 within a hub of the member 132. The member 132 is arranged to move up or down the spacer rod 133 when it is required to change the focal length of the camera and a thumbscrew (not shown) is used to secure the member 132 to the spacer 133. The members 131 and 132 are slideably held upon the hollow tubing 136 while the tubing 136 is held upright upon the base 108 by the casting 137 which has an elbow bend. The tubing 136 has at the top a roller (not shown) within the casting 138 to support a belt 139 which is placed over the roller and is attached to a counterweight inside the hollow tubing 136. The other end of the band 139 is attached at 140 to the member 131. The operation of the copying camera shown in Fig. 6 will be described later on.

It can be seen from the Figs. 3a and 3b that the one way clutch used to supply fresh film to the film housing 20 is foolproof as it does not require the attention of the operator every time a new exposure is taken and when fresh film has to be supplied. It can be seen from Fig. 3b, that unless the spur gears 30a and 30b are in mesh and the gear 30b is in mesh with the gear 78, the feeding roller 28 is not operated and no film is supplied to the exposure position. The gears 30a and 30b are brought into contact by the operation of the handle 30c that is moved by the operator every time a new exposure is taken. This arrangement permits a free movement of the copy table, lens and mask in either direction until the mask has been finally set without moving the film. Fig. 1 shows the gears in operating position.

Movement of the copy table in the direction of the arrow will advance the film and supply fresh film if so desired by the use of the spur gears 30a and 30b or by the arrangement described having only the one way clutch and dispensing with the advantages outlined above of the freedom of movement derived by the addition of the clutches 30a and 30b.

Operation

Referring to the copy camera shown in Figs. 1 to 5, the drawing or object to be photographed is placed upon the center of the copying table 71.

The camera is then set to the proper focal position which is determined by the size image desired and to this end the handle 61 in Fig. 2 is drawn toward the operator to disengage the male member 62 of the clutch 63 from the female member 64 and to connect the spur gear 58a to the spur gear 56 that is attached to the flexible shaft 54. The rotation of the crankshaft 58 now will operate the worm and gear 53 and 52 and through the medium of the spur gear 50 that is in mesh with the gear rack 49, will move the sliding members 41 and 42 upon the uprights 43 and 44. As the members 39 and 40 stand still but the members 41 and 42 are moved through the action of the flexible shaft 54, the distance between the film housing 20 and the lens carrier 36 can be changed at will. To make it easy for the operator to adjust the focal length to the proper position a calibrated scale 42c is etched upon the spacer rod 49 and a pointer 42b is etched upon the sliding member 42.

Once this distance is set the thumbscrew 92 in Fig. 4, is made fast against the spacer rod 90 to secure the portion of the camera consisting of the lens carrier and the portion of the camera comprising the film housing to each other.

The crank-shaft 58 is now returned to its original position as shown in Fig. 2, and the operator rotates the crank handle 61 to raise or lower the entire camera to or away from the copy table 71. The scale 47 etched upon the upright 44 and the pointer 48 fastened to the movable lens support 42 are provided for that purpose and the camera is now in focus.

The next operation is to center the image onto the center of the right amount of film and this is accomplished by moving the copy table to the scale number denoting the size or length of film exposed to the action of the lens. The scale is etched upon the upper side of the movable table and marked 71a and the pointer is fastened at 45a to the base 45. Inasmuch as the mask within the camera is directly geared to the copy table the readings at the table are placed there for convenience to the operator and denote the position of the mask in relation to the amount of film uncovered by it. The action of sliding the copy table will move the gear rack 89 that is securely attached thereto which in turn will rotate the spur gear 84 that is in mesh with it. The spur gear 84 being fastened to the upright shaft 81 will rotate said shaft in the direction shown by the arrow in Fig. 1. When the table 71 is moved in the direction shown by the arrow it will turn the spur gears 82 and 79 in Fig. 5, that are held over the extension hubs 83 and 80. It can be seen from the perspective view of Fig. 1, and the cross sections shown in Figs. 3 and 4, that the gears 82 and 79 are in mesh with the gear racks 87 and 76 respectively.

The gear rack 87 being attached to the lens carrier 37 of the lens holder 36 will move said carrier in the same direction to that of the copying table 71 and at the same speed because the gear 82 is the same pitch as the gear 84. The gear rack 76 that is attached to the mask 21 held in the film housing 20 will be moved simultaneously with the copy table 71 and the lens carrier 37 and in the same direction but at twice the speed of that of the copy table 71 and the lens carrier 37 because the spur gear 79 is of twice the pitch diameter of the spur gears 82 and 84.

Therefore, the lens and the center of the copy table are moved to the center of the length of the film exposed to the action of the lens by the movement of the mask and all move simultaneously.

The calibrated scale used to determine the amount of film to be exposed is practical only when the size of the image is known. When drawings are to be enlarged or reduced, these sizes must be predetermined by slide rule or by mere guess work in order that much film is not wasted.

The method of making this adjustment of the mask by means of any of the various modifications of the tubular lights and the use of the lights themselves will eliminate the use of the slide rule or guess work in making the proper adjustment of the mask.

Likewise the use of the film advancing and film ejecting means as previously described in conjunction with the camera shown in Fig. 15, and in detail in Fig. 14, may be used in the camera shown in Figs. 1 and 2, in place of the two way clutch described and illustrated in Fig. 3b.

To this end the handle 180 attached to the rack 75 is drawn toward the bumper 75b rigidly attached to the mask 21, the pin 75a having been removed to permit of this separate motion. The bumper 75b is in the path of travel of the end of rack 75 restraining it to a movement only equal to the length of film having been exposed to the action of the lens. In so doing the rack 75 revolves the spur gear 77 in counterclockwise direction. The gear 77 is attached to the ratchet member 30 of the one way clutch 31 that is fitted within the driving roller 28 contacting an idler 27. This motion however will not affect the driving roller and therefore no film will be moved. The handle 180 is now returned toward its original position and in so doing it revolves gear 77 clockwise and locks it to the one way clutch 31 which through shaft 29 revolves the feed roller 28 and the idler 27 between which the film is advanced toward the cut off knife by the exact amount required and may now be severed or left upon the roll as desired. The knife 32 drawn downward will now sever the film which will drop into the lightproof box for removal to the darkroom for development. The camera is now ready for the next exposure.

The modified camera shown in Fig. 10, operates in similar fashion to the camera shown in Fig. 1.

The operation of the camera shown in Fig. 6 requires only that the copy be placed in the center of the copy table, the camera set to its proper focal position and the bar 111 moved to the edge of the copy to be photographed. Movement of the bar 111 shifts the mask within the camera above to a like position at the edge of the image. It will be understood from the preceding description that I have provided a camera mechanism by means of which the objects of the invention indicated above are obtained. It will be understood that the various embodiments of the invention are susceptible to considerable modification without departing from the invention. Therefore, the forms of the invention described above should be considered as illustrative, only, and not as limiting the scope of the following claims.

I claim:

1. A device including a holder for light sensitive material, a sliding light-excluding curtain normally covering said material, a carrier having a lens, a bellows interposed between said holder and said carrier, an object positioning means located under said lens carrier, motion transmitting means connecting said curtain, said object positioning means, and said carrier for moving said carrier, and said object positioning means in response to movement of said curtain to maintain said lens and said object substantially centered with respect to the sensitive material uncovered by movement of said curtain.

2. A device including a holder for light sensitive material having a sliding light excluding curtain, a carrier having a lens, a bellows interposed between said holder and said carrier, an object table being located under said carrier, and motion transmitting means connecting said curtain, said lens carrier and said table for sliding said lens carrier, said curtain and said table in parallel planes to maintain a predetermined relationship therebetween.

3. A device including a holder for light sensitive material having a sliding and adjustable light excluding curtain, a carrier having a lens, a bellows interposed between said holder and said carrier, means for sliding said curtain and exposing a strip of said sensitive material to the action of said lens; an object table parallel to the focal plane of said lens and motion transmitting means connecting said curtain, said carrier and said table for sliding said lens carrier and said table simultaneously with the sliding movement of said curtain, whereby the exposing of said sensitive material by said curtain will move said lens carrier in the same direction as said curtain and at half the speed while also moving the object table aforesaid.

4. A camera including a holder for light sensitive material having an adjustable light-excluding curtain normally covering said material, a carrier having a lens, a bellows interposed between said holder and said carrier, an object table located parallel to the focal plane of said lens, and means coupling said lens carrier to said object table and to said curtain for movement in proportion to the length of sensitive material exposed to the action of said lens by the adjustment of said light excluding curtain.

5. A camera including a holder for light sensitive material, a sliding adjustable light excluding curtain normally covering said material, means for operating said sliding curtain and exposing a measured quantity of said sensitive material to a lens located under said curtain, and means for discharging the sensitive material already exposed to the action of said lens, a sliding object table parallel to the focal plane of said lens, and means coupling said lens and said object table to said sliding adjustable curtain, for sliding movement in proportion to the movement of said curtain in exposing said length of sensitive material to said lens.

6. A photostatic camera of the class described including a holder for light sensitive film, a slidably moveable light excluding curtain, film feed rollers, a lens holder, an object holder movable parallel to said light excluding curtain, and means for sliding said curtain, said object holder, and said lens holder in the same direction, said lens holder moving at half the speed in respect to the sliding motion of said curtain, said means including a gear rack attached upon said curtain, a gear rack connected to said object holder and a gear rack held upon said lens holder, said racks being in mesh with gears attached upon a common shaft, the sliding motion upon said curtain and said racks respectively operating said shaft for transmitting a sliding motion to the lens holder and said object holder aforesaid.

7. A camera having a lens for photographing an object upon light sensitive material in said camera including a slidably movable light excluding curtain normally covering said sensitive material, means for sliding said curtain and exposing portions of said material to the action of said lens, means for discharging from said camera the material already exposed, a holder for said object, motion transmitting means connecting said curtain, said lens and said holder for movement in parallel planes in response to movement of said means for sliding said curtain, whereby uncovering of a quantity of said sensitive material by the sliding motion of said curtain slides said lens and said object in the same direction, and means connecting said discharging means to said curtain for actuating the former upon movement of said curtain to cover the already exposed sensitive material.

8. A camera having a lens for photographing from an object holder upon light sensitive film in said camera, comprising a slidably movable light excluding curtain normally covering said film, means including a gear rack for sliding said curtain and exposing said film to the action of said lens, a set of rollers to discharge the already exposed film and to supply fresh film to the camera, means including a one way clutch connected to said gear rack for rotating said rollers, gear rack slidable means for supporting said lens, an object holder slidable parallel to said film having a gear rack connected thereto, gear and shaft means connecting said gear rack means of said curtain, said clutch, said lens and said object holder, whereby the sliding motion of said curtain slides said lens and said object holder in the same direction as the direction of motion of said curtain, said lens sliding at half the speed in respect to the sliding motion of said curtain, while the sliding of the curtain for covering the already exposed film operates said one way clutch and roller respectively to discharge the exposed portion of said film and advances fresh film to the exposure receiving position, and returns said lens and said object holder to their original position.

9. A copying camera comprising a holder for film, a lens holder slidable parallel and movable toward and away from said holder, an object holder slidable parallel to said film holder, a manually operated rotatable and axially movable shaft having a clutch element thereon, a cooperating clutch element, means connected with said cooperating clutch element for moving said film holder toward and away from said object holder, means for moving said lens holder toward and away from said film holder, and motion transmitting mechanism connecting the lens moving means to said shaft in one axial position of said shaft, and disengaging said lens moving means from said shaft when said clutch elements are engaged.

10. A camera comprising a holder for light sensitive film, a slidably adjustable light excluding curtain therein, said curtain normally covering said film, gear rack means connected to said curtain, a slidable carrier for said lens, gear rack means on said carrier, a slidably movable object table, gear rack means on said table, gearing connecting all of said gear rack means; a slotted lever having one end thereof pivotally attached to said curtain, a source of light on the other end of said lever, and an extension upon said lens carrier disposed within the slot of said lever, whereby sliding movement of said curtain changes the position of a light spot projected from said source of light upon the object table.

11. A camera including in combination means for feeding variable lengths of film to a position to be exposed, a slidably adjustable curtain normally covering said film, a lens holder, an object table, a slotted lever having one end thereof pivotally attached to said curtain and a light source on its other end, an extension upon said lens holder engaged in the slot upon said lever, whereby movement of said slidable curtain pivots said lever upon said extension and changes the position of a spot of light projected from said light source upon the object table aforesaid.

12. A copying camera comprising a camera back having a holder for light sensitive material, a light excluding curtain movable to cover and uncover said material, a lens carrier movable toward and away from said holder and parallel therewith, gear and rack means for adjusting the spacing between said lens carrier and said holder, an object table parallel with said holder, a pair of parallel levers pivoted on said table, an object positioning bar connecting the ends of said levers, and means connecting one of said levers with said curtain to shift said curtain as said bar is moved.

13. A camera including a holder for light sensitive film, said holder having an opening therein and a slidably adjustable light excluding curtain for closing said opening and normally covering said film, a slidably movable lens carrier, gear rack means on said lens carrier, a slidably movable object table, gear rack means movable with said object table, gear rack means for sliding said curtain, gearing connecting said gear rack means, a light source attached to the forward margin of said curtain, said light source being movable with said curtain, a secondary stationary light source within said camera at the edge of said opening adjacent the forward limit of motion of said curtain when the latter covers said film, the light beams of either one of said light sources converging through said lens and being projected upon the movable object table.

14. A camera including a holder for light sensitive film having a slidably adjustable light excluding curtain therein, said curtain normally covering said film, a movable lens carrier, a movable object table, gearing connecting said curtain, said table and said lens carrier for simultaneous movement, a light source attached to the forward margin of said curtain and movable with said curtain, the light beam of said light source converging through the lens upon said lens carrier and being projected upon the movable object table to indicate the position of said curtain.

15. A camera including a holder for light sensitive film having a slidably adjustable light excluding curtain therein, said curtain normally covering said film, a movable lens carrier spaced from said curtain, means for sliding said curtain, and a light source connected to and movable with said curtain, and means for directing a light beam from said light source to indicate the position of said curtain.

ARTHUR H. GAEBEL.

REFERENCES CITED

The following references are of record in the file of this patent:

UNITED STATES PATENTS

| Number | Name | Date |
|---|---|---|
| 2,213,734 | Hopkins | Sept. 3, 1940 |
| 2,294,992 | Landrock, et al | Sept. 8, 1942 |
| 1,412,783 | Greene | Apr. 11, 1922 |
| 2,035,558 | Lloyd | Mar. 31, 1936 |
| 1,802,194 | Caps | Apr. 21, 1931 |
| 1,964,722 | Cunningham | July 3, 1934 |
| 971,367 | Fruwirth | Sept. 27, 1910 |
| 2,203,783 | Hineline | June 11, 1940 |
| 2,166,419 | O'Neill | July 18, 1939 |
| 2,047,478 | Lloyd, et al | July 14, 1936 |
| 1,847,531 | Kesses | Mar. 1, 1932 |
| 1,992,492 | Lloyd | Feb. 26, 1935 |

FOREIGN PATENTS

| Number | Country | Date |
|---|---|---|
| 604,237 | German | Sept. 27, 1934 |